United States Patent Office 3,660,395
Patented May 2, 1972

---

3,660,395
THIOETHER CEPHALOSPORIN COMPOUNDS
Ian G. Wright, Greenwood, and Gary V. Kaiser, Indianapolis, Ind., assignors to Eli Lilly and Company, Indianapolis, Ind.
No Drawing. Filed Mar. 4, 1970, Ser. No. 16,561
Int. Cl. C07d 99/24, 99/16
U.S. Cl. 260—243 C    19 Claims

ABSTRACT OF THE DISCLOSURE 2-thiomethyl- and 2-thiomethylene ethers of $\Delta^3$-cephem - 4 - carboxylic acids, e.g., 3-acetoxymethyl-2-phenylthiomethylene-7-(2'-thienylacetamido) $\Delta^3$-cephem-4-carboxylic acid, useful as antibiotics, esters of such acids which are useful as intermediates to make antibiotic compounds.

INTRODUCTION

This invention relates to cephem derivatives which also frequently are referred to as cephalosporanic acid derivatives. More particularly, this invention provides a group of new 2-(R-thiomethyl-) and 2-(R-thiomethylene) cephem acids, zwitterions, salts, and esters, which are useful generally as antibiotics or as intermediate chemicals in the process route to new antibiotically active $\Delta^3$-cephem acid derivatives. These new compounds can be prepared by reacting a thiol (mercaptan) with a 2-methylene-$\Delta^3$-cephem-4-carboxylate ester -1-oxide compound described and claimed in a co-pending application of Ian G. Wright, Ser. No. 16,573, filed of even date herewith.

BACKGROUND OF THE INVENTION

In recent years, new cephalosporin antibiotics such as cephalothin (U.S. Pat. 3,218,318) and cephaloridine (U.S. Pat. 3,449,338) have been discovered. These antibiotics are presently being manufactured as derivatives of fermentation derived cephalosporin C (U.S. Pat. No. 3,093,638), and its nucleus, 7-aminocephalosporanic acid (7–ACA) (U.S. Pat. 3,207,755). These antibiotics are very effective but are administered primarily by the parenteral route. More recently, those skilled in the cephalosporin antibiotic art have been working to develop cephalosporin type antibiotics which may be absorbed into the blood when administered by the oral route. Two of such oral cephalosporin antibiotics being developed are cephaloglycin and cephalexin. Cephaloglycin can be made by acylating the cephalosporin C nucleus, 7–ACA, with an N-protected activated form of phenylglycine. Cephalexin can be prepared in a similar manner by acylating 7-aminodesacetoxycephalosporanic acid (7–ADCA), (U.S. Pat. 3,124,576) or an ester or other derivative thereof with the N-protected activated form of phenylglycine, and thereafter removing the protecting group. However, newly discovered processes (U.S. Pat. 3,275,626) have enabled the manufacture of cephalexin and numerous other cephalosporin antibiotics by processes which includes the steps of acylation of the 7-aminodesacetoxycephalosporanate esters obtained by the ring expansion of a penicillin sulfoxide ester, e.g., a p-nitrobenzyl phenoxymethylpenicillin sulfoxide ester, followed by cleavage of the phenoxymethyl side chain, and reacylation of the resulting 7-aminodesacetoxycephalosporanate ester with the N-protected activated form of phenylglycine, and removal of the N-protecting group and the ester group to obtain cephalexin as the zwitterion, or a salt thereof with a pharmaceutically acceptable acid or base.

However, research work continues in the cephalosporin chemistry area. There is a need to find other new and useful compounds in this area, either to be useful as antibiotics themselves, or as intermediates to other antibiotic compounds having a strong potency or a different spectrum of activity against a variety of Gram positive and Gram negative microorganisms. A purpose of this invention is to provide the cephalosporin art with some new cephalosporin compounds which are useful as antibiotics per se or as intermediates in the preparation of new and useful cephalosporin compounds which inhibit the growth of various microorganisms.

It is a specific object of this invention to provide a class of new 2-(thiomethyl) and 2-(thiomethylene)-$\Delta^3$-cephalosporin acids, and esters, which are especially useful as antibiotics or as intermediates to the production of new cephalosporin antibiotics.

SUMMARY OF THE INVENTION

Briefly, this invention provides a process for synthesizing new 2-thiomethyl-cephalosporin sulfoxide esters, reduction products thereof, the 7-amino-2-thiomethyl and 7-amino-2-thiomethylene-$\Delta^3$-cephalosporin nuclei derivaatives thereof, and certain reacylated derivatives thereof. The new compounds can be described as having one of the following general formulas:

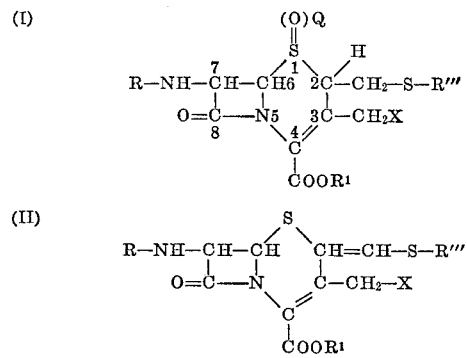

wherein R generally in each of Formulas I and II is hydrogen, a salt derivative thereof, or an amino protecting group, $R^1$ is hydrogen or the residue of a carboxyl protecting group which can be removed readily by chemical methods without disrupting the cephem ring structure, Q is 0 or 1, indicating the sulfide or sulfoxide state of the sulfur atom in the ring system, and X is hydrogen, hydroxy, $C_1$ to $C_6$-alkanoyloxy, or $C_1$ to $C_6$-alkyloxy, and $R'''$ is the residue of the mercaptan.

The compounds of Formula I wherein Q is 1 are prepared by reacting the thiol with a corresponding 2-methylene-$\Delta^3$-cephalosporin sulfoxide ester. The compounds of Formula I where Q is zero are prepared by reducing the thiol treated product, in a substantially anhydrous liquid medium at a temperature of from about $-80°$ C. to about $100°$ C. to form the $\Delta^3$-cephalosporin ester.

The 2-thiomethylene ether compounds of Formula II are prepared by treating the 2-thiomethyl ether $\Delta^3$-cephalosporin sulfoxide ester compounds, described above, with a $C_1$ to $C_6$-alkanoic acid in the presence of an alkali metal alkanoic acid salt.

The 7-amino-2-thiomethyl- and 2-thiomethylene-$\Delta^3$-cephalosporin nuclei compounds are prepared by reacting a compound of Formulas I where Q is 0, or II, where R is an amino protecting group, with a sulfonic acid solution, or with $PCl_5$ in the presence of a tertiary amine, followed by treatment with an alcohol, and then with water to cleave the protecting group. The resulting nuclei can be recovered and reacylated with acyl groups known to contribute to the formation of potent cephalosporin antibiotic activity.

DETAILED DESCRIPTION OF THE INVENTION

Specific starting materials, intermediates, and products of this invention are sometimes named, for convenience, by use of the "cephem" nomenclature system. "Penam" nomenclature for the penicillins is described by Sheehan, Henery-Logan, and Johnson in the Journal of the American Chemical Society (JACS), 75, 3292, footnote 2 (1953), and has been adapted to the cephalosporins by Morin, Jackson, Flynn, and Roeske (JACS, 84, 3400 (1962)). In accordance with these systems of nomenclature "penam" and "cepham" refer respectively to the following saturated ring system:

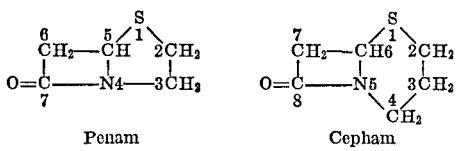

Penam    Cepham

"Cephem" refers to the cepham ring structure containing a double bond, the position of which is indicated by a prefixed "Δ" with a superscript denoting the lowest numbered atom to which the double bond is connected, or by the word "delta" with the same number relationship. Sometimes the position of the double bond is indicated by the carbon atom number only. Thus, for example, penicillin V, 6-phenoxymethylpenicillin, can be named 6-(phenoxyacetamido) - 2,2 - dimethylpenam-3-carboxylic acid, and 7-phenoxyacetamidodesacetoxycephalosporanic acid can be named as 7-phenoxyacetamido-3-methyl-$\Delta^3$-cephem-4-carboxylic acid.

STARTING MATERIALS

The 2-methylene-$\Delta^3$-cephalosporin sulfoxide starting materials are most conveniently described by the general Formula III.

(III)
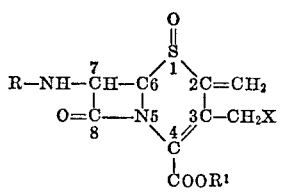

wherein R is an amino-protecting group which is not removed by the oxidizing reagents and/or esterification reagents, or the like used in preparing these sulfoxide esters, $R^1$ denotes the carboxyl protecting group, preferably an easily removable ester group, and X is hydrogen, hydroxy, $C_1$ to $C_6$-alkanoyloxy, or $C_1$ to $C_6$-alkyloxy. The R group can be any known peptide blocking group, for example, triphenylmethyl, benzyloxycarbonyl, adamantyloxycarbonyl, methyl - substituted adamantyloxycarbonyl, $C_4$ to $C_6$-tert-alkyloxycarbonyl groups such as tert-butoxycarbonyl, tert - pentyloxycarbonyl, tert - hexyloxycarbonyl, a $C_5$ to $C_7$-tert-alkenyloxycarbonyl groups such as tert-pentenyloxycarbonyl, tert-heptenyloxycarbonyl, a $C_5$ to $C_7$-tert-alkynyloxycarbonyl groups such as tert-pentynyloxycarbonyl, tert-hexynyloxycarbonyl, tert-heptynyloxycarbonyl, a $C_4$ to $C_7$ - cycloalkyloxycarbonyl groups, such as cyclopentyloxycarbonyl, cyclohexyloxycarbonyl, and the like. R can also be an acyl group which are known in the penicillin and cephalosporin antibiotic literature. The selected acyl groups should be stable to the oxidizing and esterification conditions used in preparing the 2-methylene-$\Delta^3$-cephalosporin sulfoxide ester starting materials. Examples of the preferred acyl groups which can be used as amino-protecting groups may be described by the formula

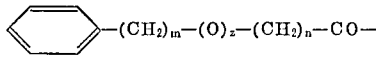

wherein m is an integer of from 0 to 4 inclusive, n is an integer of from 1 to 4 inclusive, Z is 0 or 1, and when Z is 0, the methylene carbon atoms in m and n are connected by a chemical bond, and such acyl groups substituted on phenyl carbon atoms with fluorine, chlorine, bromine, $C_1$ to $C_6$-alkyl, $C_1$ to $C_2$-alkoxy, nitro, cyano, or trifluoromethyl groups. A few representative examples of such preferred acyl groups include:

phenylacetyl
phenoxyacetyl
benzyloxyacetyl
phenylpropionyl
phenylbutoxybutyryl
3-fluorophenoxyacetyl
4-bromophenylacetyl
2-chlorobenzyloxypropionyl
4-ethoxyphenylhexanoyl
3-methylphenylbutyryl 4-nitrophenylacetyl
3-cyanophenylpropionyl
4-trifluorophenoxyacetyl, and the like.

Numerous other compounds which form amino-protecting acyl groups which can be used in the R position are known in the prior art; e.g., those disclosed in the Behrens et al. U.S. Pats. 2,479,295 to 2,479,297, and 2,562,407 to 2,562,411, and 2,623,876. Other useful acyl groups include 2-thienylacetyl, 3-thienylacetyl, 2-furylacetyl, 3-furylacetyl, 2-(3,4-benzothienyl)acetyl, 2-(3,4-benzofuryl)acetyl, and the like.

The carboxyl-protecting group represented by $R^1$ in the above formula should be a group which is removable by the use of conditions and reagents which do not destroy the cephem nucleus of the cephalosporin structure. It is preferably an ester group (such as 2',2',2'-trichloroethyl) which is removable by treating the ester with zinc in a $C_1$ to $C_6$-alkanoic acid or hydrochloric acid, an ester group which is removable with acid alone such as a $C_4$ to $C_6$-tert-alkyl group, e.g., tert-butyl, tert-pentyl, tert-hexyl, a $C_5$ to $C_7$-tert-alkenyl or a $C_5$ to $C_7$-tert-alkynyl group e.g., tert-pentenyl, tert-hexenyl, tert-heptynyl, an ester group, removable by treatment with sodium thiophenoxide, of the formula

—$CH_2R''$ where $R''$ represents a $C_1$ to $C_6$-alkanoyl, N-phthalimido, benzoyl, naphthoyl, furoyl, thenoyl, nitrobenzoyl, halobenzoyl, methylbenzoyl, methanesulfonylbenzoyl, or phenylbenzoyl group which are described more fully in U.S. Pat. 3,284,451, or a benzyl, 3-or 4-nitrobenzyl, 3- or 4-methoxybenzyl benzhydryl, trimethylsilyl group, or the like.

The X symbol bonded to the methylene carbon in the 3-position of the molecule can be any atom or group which does not interfere with or is stable to the oxidizing and esterification conditions used to prepare the starting material. For simplicity of operating the process we prefer that X be hydrogen, hydroxyl, $C_1$ to $C_6$-alkanoyloxy, or $C_1$ to $C_6$-alkyloxy, although a wide variety of equivalent groups can be used. Hydrogen is present in the X position when the compound being treated by the thiol and the product formed as a result of such treatment is a desacetoxycephalosporanic acid ester. Such compounds are formed when penicillin sulfoxide esters are heat rearranged under acid conditions, according to methods now known, e.g., as described in U.S. Pat. 3,275,626. When X is desired to be hydroxyl a corresponding 3-bromomethyl-$\Delta^2$-cephalosporin ester can be treated with water to replace the bromine with a hydroxyl group. A $C_1$ to $C_6$-alkyloxy group can be put into the X position in a similar manner by reacting the 3-bromomethyl-$\Delta^2$-cephalosporin ester with a $C_1$ to $C_6$-alkanol. Similarly, X can be converted to a $C_1$ to $C_6$-alkanoyloxy group by reacting the 3-bromomethyl-$\Delta^2$-cephalosporin ester with a $C_1$ to $C_6$-alkanoic acid to replace the bromine with the respective $C_1$ to $C_6$-alkanoyloxy group. Such an operation is not necessary where X is acetoxy since cephalosporanic acid already contains the 3-acetoxymethyl group. Commercially produced derivatives of this acid which can be used include 7-aminocephalosporanic acid which is obtained by cleavage of the 5-aminoadipoyl side chain from cephalosporin C by known methods. The 3-bromomethyl-$\Delta^3$-cephalosporin esters which can be used to prepare the compounds of this invention can be prepared by brominating with N-bromosuccinimide a 3-methyl-$\Delta^2$-cephalosporin ester, preferably a $C_4$ to $C_6$ tert-alkyl or 2,2,2-trichloroethyl ester by methods now known.

The reaction between the formaldehyde, or an equivalent methylene group supplying reagent and the selected $\Delta^3$-cephalosporin sulfoxide ester to prepare the starting materials for the compounds of this invention can be conducted in an aqueous or organic liquid medium or in a mixed aqueous/organic solvent system, in the presence of a primary or secondary amine, or an acid salt of such an amine, at temperatures ranging from about 0° C. to the reflux temperature of the system, generally below about 120° C. Preferred amines are the alkylamines, and dialkylamines such as methylamine, ethylamine, n-propylamine, isopropylamine, n- and isobutylamines, tert-butylamine, dimethylamine, diethylamine, dipropylamine, dibutylamine, piperidine, pyrrolidine, and the hydrochloride or sulfate or other acid salts of such amines. In general, the amine salts are preferred since they do not cause discoloration of the reaction mixture as much as do the free amines. Some salts such as ammonium chloride, trimethylamine hydrochloride, triethylamine hydrochloride, and zinc chloride give traces of product but the yields are much poorer than those when the primary and secondary amines are used. The formaldehyde may be used in any of its reactive forms such as trioxymethylene, solid polymeric formaldehyde, and the like, but with most of the selected $\Delta^3$-cephalosporin sulfoxide esters, an aqueuos formaldehyde solution is preferred. In preferred procedures, reaction temperatures of from about 40° C. to about 110° C. for from about 1 to about 24 hours are used to insure complete reaction. The reaction can be conducted under anhydrous conditions, if necessary, as when a trimethylsilyl ester group is used, by using a formaldehyde condensation product in which water of condensation between the amine and the formaldehyde has been removed. For example, the reagent reported by P. Potier et al. (J. Am. Chem. Soc., 90 5622 (1968)), which consists of N,N-dimethylformaldimonium trifluoroacetate generated from trimethylamine oxide and trifluoroacetic anhydride in an anhydrous medium can be used. These starting materials are referred to generally herein as the "2-methylene-$\Delta^3$-cephalosporin ester sulfoxide" compounds in that the "2-methylene" refers to the $CH_2=$ group bonded to the carbon atom in the 2-position of the dihydrothiazine ring moiety of the cephalosporin compound; the "$\Delta^3$-cephalosporin" refers to the position of the carbon-to-carbon double bond in the bicyclic cephalosporin molecule, the "ester" indicates the presence and chemical state of the carboxyl group attached to the carbon atom in the 4-position; and the "sulfoxide" indicates that the sulfur in the 1-position of the cephalosporin molecule is in the sulfoxide oxidation state. For example, a preferred starting material 2,2,2-trichloroethyl 7 - (phenoxyacetamido) - 2 - methylene-3 - methyl - $\Delta^3$ - cephem - 4 - carboxylate-1-oxide, is a specific 2 - methylene - $\Delta^3$ - cephalosporin ester sulfoxide, and is obtainable by the following sequence of reactions:

(1) Penicillin V (phenoxymethylpenicillin) is esterified with 2,2,2-trichloroethanol and oxidized to the 2,2,2-trichloroethyl penicillin V sulfoxide ester by procedures now known. Alternatively, the oxidation and esterification steps can be reversed.

(2) The resulting 2,2,2-trichloroethyl penicillin V sulfoxide ester is rearranged by heating at 80° C. to 150° C. in the presence of an acid such as p-toluenesulfonic acid while removing water from the reaction to form 2,2,2-trichloroethyl 3 - methyl-7-phenoxyacetamido-$\Delta^3$-cephem-4-carboxylate.

(3) The 2,2,2-trichloroethyl 3-methyl-7-phenoxyacetamido-$\Delta^3$-cephem-4-carboxylate ester is treated with a peracid to oxidize the compound to 2,2,2-trichloroethyl 3 - methyl - 7 - phenoxyacetamido - $\Delta^3$ - cephem-4-carboxylate-1-oxide (the sulfoxide), and (4) The sulfoxide from step 3 is treated with formaldehyde or an equivalent reagent in the presence of a primary or secondary amine, or an acid salt of such amine at a temperature of from about 0° C. to about 120° C., preferably from about 40° C. to about 110° C. in an aqueous or organic liquid medium to form the 2,2,2-trichloroethyl-2-methylene - 3 - methyl-7-phenoxyacetamido-$\Delta^3$-cephem-4-carboxylate-1-oxide.

THIS INVENTION

According to this invention, a thiol is reacted with a 2-methylene-$\Delta^3$-cephalosporin sulfoxide ester or other derivative in which the carboxyl group is protected to form the 2-thiomethyl-$\Delta^3$-cephalosporin sulfoxide ester. We prefer that the thiol used be one having the formula $R'''$—SH, where $R'''$ is defined and exemplified below. The reaction can occur in an organic solvent system or a water mixture at temperatures from just about the freezing point to reflux temperatures, preferably at from about $-70°$ C. to about 100° C. With most reactants the reaction takes place quite readily at room temperature. Organic diluent systems should be used when the ester group is trimethylsilyl group. These new compounds, useful as intermediates, have the general Formula I above, where $Q=1$, and wherein R, $R^1$, and X are defined above, the $R'''$ is the residue of the thiol used in the reaction. $R'''$ is preferably hydrogen, or a $C_1$ or $C_{12}$-hydrocarbon radical, a $C_1$ to $C_{12}$-hydrocarbon radical substituted with halogen, Carbo-$C_2$ to $C_3$-alkyloxy, carboxyl, or hydroxyl, or $R'''$ can be any of various monocyclic heterocyclic ring radicals such as 2-furylmethyl, and the like.

Examples of thiols which may be used in preparing these new compounds of this invention include hydrogen sulfide, as well as hydrocarbon thiols or mercaptans having from 1 to about 12 carbon atoms in the hydrocarbon moiety including $C_1$ to $C_{12}$-alkanethiols such as methyl, ethyl, propyl, butyl, hexyl, mixed amyl, heptyl, octyl, nonyl, decyl, undecyl, and dodecyl mercaptans, both straight and branched chain $C_3$ to $C_{12}$-alkenyl and $C_3$ to $C_{12}$-alkynyl mercaptans, e.g., allyl, butenyl, pentenyl, heptenyl, octenyl, dodecenyl, propynyl, butynyl, hexynyl, octynyl mercaptans, cycloaliphatic hydrocarbon mercaptans having from 3 to 12 carbons such as cyclopropyl, cyclobutyl, cyclopentyl, cyclohexyl, cycloheptyl, cyclooctyl, cyclopentenyl, and cyclohexenyl mercaptans, as well as $C_7$ to $C_9$ bicyclo-cycloaliphatic hydrocarbon mercaptans such as 5-norbornenyl, and isobornyl mercaptans, the mono and bicyclo aryl, alkaryl, and aralkyl hydrocarbon mercaptans having from 6 to about 12 carbon atoms such as phenyl, tolyl, xylyl, $\alpha$-naphthyl, $\beta$-naphthyl, biphenylyl, methylnaphthyl, benzyl, 2-phenylethyl, 3-phenylpropyl mercaptans, as well as said hydrocarbon mercaptans having non-interfering substituents such as halogen, e.g., fluorine, chlorine, bromine, iodine, such as in 2 - chloroethyl, p - chlorobenzyl, 2,4,5 - trichlorobenzyl, p-bromophenyl, as well as carbo-$C_1$ to $C_3$-alkyloxy, carboxyl, hydroxyl, such as m-carbomethoxyphenyl 3-mercaptobenzoic acid, 3-hydroxyphenyl mercaptan and the like, as well as heterocyclic thiols such as 2-thienylmethyl, 2 - furylmethyl, benzothienylmethyl, benzofurylmethyl, 2-pyridyl, 1-methyl-5-tetrazolyl, 2-pyrimidyl, and the like.

The 2-thiomethylene-$\Delta^3$-cephalosporin ester derivatives can be prepared from the above 2-thiomethyl-$\Delta^3$-cephalosporin sulfoxide esters, either as a separate step by the subsequent reaction thereof with a $C_1$ to $C_6$-alkanoic acid in the presence of an alkali metal alkanoic acid salt or by in situ reaction during the thiol treatment. The alkanoic acid, which can be formic, acetic, propionic, butanoic pentanoic, hexanoic acid or mixtures thereof is generally used in solvent quantities with a small amount of a sodium or potassium salt of such an acid, or the salt is formed in situ by known methods. Other alkali metal salts can be used, but the sodium and potassium salts are the most practical. When the alkanoic acid and alkali metal alkanoate salt are present, the 2-thiomethyl-$\Delta^3$-cephalosporin sulfoxide ester undergoes a reaction to form the 2-thiomethylene-$\Delta^3$-cepthalosporin ester derivative. In effect, this reaction is a dehydration in that the elements of water are removed but it also effects a reduction of the sulfoxide to the sulfide state. In such state, the new compounds of this invention have an exocyclic carbon-to-carbon double bond as shown by their structure (II)
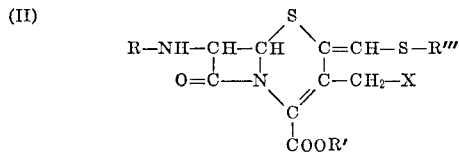

wherein R, R' and R''' and X are as defined above.

In preparing the compounds of Formula I above wherein Q is 0, that is, the 2-methylthio ethers of $\Delta^3$-cephalosporin esters, the intermediate products obtained by reacting the thiol with the 2-methylene-$\Delta^3$-cephalosporin sulfoxide ester, are treated with a reducing agent selected from the group consisting of (1) Stannous, ferrous, or manganous cations, (2) Dithionite ($S_2O_4=$), iodide, or ferrocyanide anions, (3) Trivalent phosphorus compounds having a molecular weight below about 500, (4) A halomethylene iminium halide of the formula

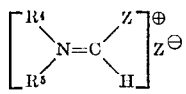

wherein Z is chlorine or bromine and each of $R^4$ and $R^5$, taken separately, denotes a $C_1$ to $C_3$-alkyl, or taken together with the nitrogen to which they are bonded, complete a monocyclic, heterocyclic ring having from 5 to 6 ring forming atoms and a total of from 4 to 8 carbon atoms, in the presence or absence (depending upon the choice of reducing agent) of an activating agent which is an acid halide of an acid of carbon, sulfur, or phosphorus, which acid halide is inert to reduction by the reducing agent, and which acid halide has a second order hydrolysis constant, equal to, or greater than that of benzoyl chloride, in a substantially anhydrous liquid medium at a temperature of from about $-20°$ C. to about $100°$ C. to form the 2-thiomethyl-$\Delta^3$-cephalosporin ester.

This reduction can be conducted in the absence of the externally supplied acid halide activator when the reducing agent is (1) a trivalent phosphorus compound having at least one chlorine, bromine, or iodine bonded to the trivalent phosphorus alone, any remaining valences of the trivalent phosphorus atom being satisfied by a -hydrocarbon, —O-hydrocarbon, or a —S-hydrocarbon radical which is free of aliphatic unsaturation and has from 1 to 8 carbon atoms, or such -hydrocarbon, —O-hydrocarbon, or —S-hydrocarbon radicals substituted with chlorine or bromine, or (2) a halomethylene iminium halide, as defined above. Preferred reducing agents for most of the compounds are a combination of stannous chloride and acetyl chloride, or phosphorus trichloride in the presence or absence of an activator. These reducing conditions are described in more detail in copending application Ser. No. 764,925, filed Oct. 3, 1968, which is incorporated herein by reference thereto.

The reducing agents or reactant (b) used in the process of this invention may be divided into two classes: those requiring the presence of an external activating agent, and those which do not need an external activating agent. This latter class of reducing agent provides its own activation and does not need the presence of a third chemical activator reactant although the latter can be used therewith if desired. An activator as defined for this invention is a chemical molecule, ion, or moiety, which activates either the cephalosporin sulfoxide or the reducing agent for the overall reduction process. We believe that coordination of the activator moiety with the cephalosporin sulfoxide group is the actual mechanism for activation in most reductions, but we do not wish to be limited to this chemical mechanism theory in this invention, nor is it meant to limit the invention to the use of chemicals that act as activators by this mechanism and exclude activators that may operate by some as yet unknown mechanism.

Examples of reducing agents of these classes are listed below:

(1) Stannous, ferrous, cuprous, or manganous cations: These cations were used in the form of inorganic or organic compounds or complexes which are at least partially soluble in the liquid medium and are exemplified by stannous chloride, stannous fluoride, stannous acetate, stannous formate, ferrous chloride, ferrous oxalate, ferrous succinate, cuprous chloride, cuprous benzoate, cuprous oxide, manganous chloride, manganous acetate, manganous oxide, and the like, as well as such cations provided in the form of complexes with known chelating agents such as ethylenediaminetetracetic acid (EDTA), nitrilotriacetic acid, and the like;

(2) Dithionite ($S_2O_4=$), iodide, ferrocyanide anions: These anions can be used in the form of various inorganic or organic salts or complexes which provide the anion to the reaction medium. A few examples of useful compounds containing these anions are alkali metal, particularly the sodium and potassium salts of dithionite, iodide, or ferrocyanide, as well as hydroiodic acid, ferrocyanic acid, and the like.

(3) Trivalent phosphorus compounds having a molecular weight below about 500. These compounds can be inorganic or organic and include phosphines as well as phosphinite, phosphonite, and phosphite esters containing one, two, three, or mixtures of trivalent phosphorus-carbon, trivalent phosphorus-oxygen, or trivalent phosphorus-sulfur bonds, as well as inorganic trivalent phosphorus halides and amides, and trivalent phosphorus compounds containing one or two phosphorus-halogen bonds with the remaining trivalent phosphorus bonds being satisfied by organic radicals as defined above. In general, such compounds are the organic compounds of trivalent phosphorus and are the triaryl phosphites, trialkyl phosphites, mixed aryl alkyl phosphites, as well as the corresponding phosphonites, and phosphinite esters, and the triarylphosphines. In general, we prefer that such compounds have molecular weights below about 500 and are exemplified by triphenyl phosphite
tritolyl phosphite
trixylyl phosphite
tricresyl phosphite
trimethyl phosphite
triethyl phosphite
trihexyl phosphite
phenyl dimethyl phosphite
diphenyl ethyl phosphite
tolyl dihexyl phosphite
cresyl dimethyl phosphite
diphenyl phenylphosphonite
dicresyl cresylphosphonite
dimethyl methylphosphonite
dihexyl phenylphosphonite
methyl diphenylphosphinite
phenyl diethylphosphinite
xylyl dipropylphosphinite
cresyl dihexylphosphinites
triphenylphosphine
tritolylphosphine
trixylylphosphine
trimethylphosphine
tripropylphosphine and other trivalent phosphorus organic compounds with similar organic groups, as well as such compounds containing non-interfering substituents on carbon atoms of such compounds such as halogen, e.g., chlorine and bromine, such as tris(2-chloroethyl) phosphite
bis(2-chloroethyl) phenylphosphonite
2-chloroethyl dicresylphosphonite
tris(2-bromoethyl) phosphite and the trivalent phosphorus amide compounds N,N',N''-hexamethylphosphoramidite,
N,N',N''-hexaethylphosphoramidite, and
N,N',N''-tetramethyl(phenyl)phosphonodiamidite.

Other trivalent phosphorus compound reducing agents which may be used are those which contain at least one halogen such as chlorine or bromine, bonded directly to the trivalent phosphorus, e.g., phosphorus trichloride
phosphorus tribromide, and
phosphorus triiodide, as well as such trivalent phosphorus compounds having organic groups bonded to the trivalent phosphorus, as well as the halogen, e.g., phenyl phosphorodichloridite
dimethyl phosphorobromidite
phenyl hexyl phosphorochloridite
tolylphosphonodibromidite
cresylphosphonochloridite
p-chlorophenylphosphonodichloridite
diethylphosphinobromidite
diphenylphosphinochloridite
dixylylphosphinobromidite, and the like.

In general, trivalent phosphorus compounds having halogen bonded to the phosphorus will reduce the cephalosporin sulfoxides without the external activator.

(4) Halomethylene iminium halide compounds: These reducing agents have the formula

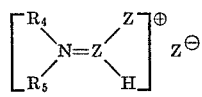

wherein Z is chlorine or bromine and each of $R_4$ and $R_5$ taken separately denote a $C_1$ to $C_3$-alkyl group, e.g., methyl, ethyl, propyl, isopropyl, or taken together with the nitrogen to which they are bonded complete a monocyclic heterocyclic ring having from 5 to 6 ring forming atoms and a total of from 4 to 8 carbon atoms. These halo methylene iminium halide reducing agents can be prepared in situ, that is, in the reaction mixture for the process of this invention by reacting an appropriate formamide with a halogenating agent. For example, by adding dimethylformamide and an equimolar amount of a chlorinating agent such as oxalyl chloride, phosphorus oxychloride, thionyl chloride to the reaction mixture containing the $\Delta^3$-cephalosporin sulfoxide, there is formed chloromethylene N,N-dimethyliminium chloride, which reacts with the $\Delta^3$-cephalosporin sulfoxide to form the corresponding $\Delta^3$-cephalosporin. Other examples of chloromethylene amide chlorides which may be used include:

chloromethylene N,N-diethyliminium chloride
chloromethylene N-pyrrolidiniminium chloride
chloromethylene N-piperidiniminium chloride and the like.

The bromine analogs of such compounds such as bromomethylene N,N-dimethyliminium bromide also can be prepared and used in a similar manner from the respective brominating agents if desired. These halomethylene iminium halide reducing agents which are preferably prepared in situ, do not need the external activating agent.

The activating agent which may or may not be used in the process of this invention, depending upon the choice of reducing agent, is generally an acid halide of an acid of carbon, sulfur, or phosphorus and is preferably inert to reduction by the reducing agent, to economize on reactants, and consequently should not contain reducible groups such as nitro or sulfoxide.

The acid halide used in this reduction process should be one that has a second order hydrolysis constant value in 90 percent acetone and water solution at least as great as that of benzoyl chloride, as set forth by Beck and Ugi, Chem. Ber., 94, 1839 (1961). Some substituted acid halides, e.g., possess higher hydrolysis constants than benzoyl chloride, but are ineffective for activation, presumably because the substituent group, e.g., nitro, is reduced and the resulting acid chloride has an undesirably slow hydrolysis rate.

Examples of carbon acid halides which may be used as activators include phosgene, carbonyl dibromide, oxalyl chloride, $C_2$ to $C_{10}$ alkanoic acid halides, preferably the chlorides or bromides, e.g., acetyl chloride, acetyl bromide, propionyl chloride, butanoyl bromide, hexanoyl chloride, octanoyl bromide, decanoyl chloride. Useful sulfur acid halides are exemplified by thionyl chloride, thionyl bromide, methanesulfonyl chloride. Phosphorus acid halides are represented by phosphorus oxychloride, phosphorus oxybromide, as well as the halogenated trivalent phosphorus compounds mentioned under reducing agents, e.g., phosphorus trichloride, methyl phosphorodichloridite, and the like.

In the practice of the process of this invention, many combinations of cephalosporin sulfoxides, reducing agents, and activators are possible. Not all combinations are equally effective, so that for a given reducing agent one or more activating agents will give optimum reductions of cephalosporin sulfoxides. In general, however, the most active activating agents are the chemically simplest ones, and are most generally applicable.

The cephalosporin sulfoxide is generally combined with at least a reducing equivalent of the reducing agent, and and equivalent amount of the activating agent if the selected reducing agent is one that needs external activation. As a practical matter, at least a slight excess of reducing agent and activating agent are used, relative to the cephalosporin sulfoxide on a reducing equivalent basis to insure complete reduction thereof, because the sulfoxide is usually the most expensive of the three reactants. The liquid medium may be provided by any substantially anhydrous organic liquid which is inert to the reduction reaction, or can be provided by an excess of any liquid activating agent that is used, e.g., acetyl chloride, without detriment to the reactants or cephalosporin sulfide product. Although anhydrous conditions are preferred, the presence of a small amount of water in the mixture, under 5 percent, is not seriously detrimental to the reaction.

The reduction process of this invention may be conducted in a wide variety of organic solvents or diluents. It is preferred to use a solvent that will at least partially dissolve the cephalosporin sulfoxide, reducing agent, and external activator, if used. For these reductions, the preferred solvents are inert to the action of reducing and activating agents. Since the best activators are acid halides, solvents containing hydroxyl, amino groups having hydrogen bonded to the amino groups, or free mercapto groups should not be used. Similarly, solvents containing readily reducible groups such as nitro and sulfoxide groups which may consume some of the reducing agent are not preferred because they are wasteful of reducing agents, although such solvents are not precluded if the cephalosporin sulfoxide reduction proceeds at a sufficiently greater rate than solvent reduction. Useful solvents or diluents for this purpose include the common hydrocarbon solvents such as benzene, toluene, xylene, heptane, esters such as ethyl acetate, amyl acetate, ethers such as ethyl ether and tetrahydrofuran, ketones such as acetone, methyl ethyl ketone, alkanenitriles such as acetonitrile, propionitrile, sulfones such as dimethylsulfone, diphenylsulfone, and tetramethylene sulfone (sulfolane), halogenated hydrocarbons such as dichloroethane, dichloromethane, chloroform, carbon tetrachloride, tertiary amides of carboxylic, phosphoric, phosphinic acids, and sulfonic acids which are liquid at the desired temperature of reduction, e.g., dimethylformamide, dimethylacetamide, diethylformamide, hexamethylphosphoramide, N,N,N',N' - tetramethyl (methyl)-phosphonamide, N,N-dimethyl(dimethyl)phosphinamide, N,N-dimethyl(methane)sulfonamide, N,N-diethyl(phenyl)sulfonamide, and the like. Some nitroparaffins are useful as solvents with certain reducing agents, e.g., nitromethane, nitroethane, and nitropropane. Of course, mixtures of solvents which provide ready dissolution of reactants and dissipation of heat of reaction are also contemplated for use in the process of this invention. If the activating agent used is a liquid, it can also serve as the solvent for the reactants if used in excess.

The temperature at which the reduction is conducted is a function of several factors. In general, the reduction can be conducted at temperatures of from about $-20°$ C. to about $100°$ C. However, the most active activators coupled with the most active reducing reagents permit reduction at relatively low temperatures (at or below room temperatures) in short periods of time. If the selected reducing agent is less active, or if the reducing agent and activator combination used therewith is relatively slow reacting at low temperature, the temperature is raised to permit the reduction to proceed at a rate consistent with economics and optimum yield.

The compounds of Formulas I where $Q=0$ and II above can be used to form the respective 2-thiomethyl- or 2-thiomethylene-$\Delta^3$-cephalosporin acid or ester nuclei of the Formulas IV and V (IV)
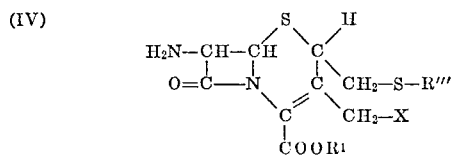

(V)
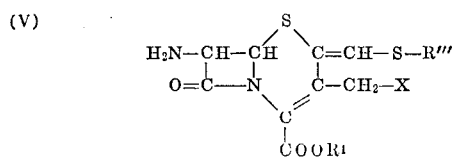

wherein R' is hydrogen, or an ester group as defined above, and R''' is the remainder of the thiol which was used in the reaction.

The compounds of Formulas I where $Q=0$ and II can be treated with phosphorus pentachloride or phosphorus oxychloride in the presence of a tertiary amine such as pyridine or N,N-dimethylaniline, followed by treatment with an alcohol such as methanol either alone or in the presence of an organic diluent such as tetrahydrofuran, and then with water, either alone or mixed with an organic diluent, to form the corresponding 7-amino-2-thiomethyl-$\Delta^3$-cephalosporin ester (IV) or 7-amino-2-thiomethylene-$\Delta^3$-cephalosporin ester (V) nuclei. The ester group can be removed, if desired, and the nuclei can be recovered from the reaction mixture by the treatment of the reaction mixture with a hydrocarbonsulfonic acid, preferably a $C_6$ to $C_{12}$-aryl hydrocarbonsulfonic acid, e.g., p-toluenesulfonic acid, 1- and 2-naphthylenesulfonic acid to precipitate the respective salt of the 7-amino-2-thiomethyl- or 2-thiomethylene-$\Delta^3$-cephalosporanic acid or ester. These nuclei acids and esters can be re-acylated with acyl groups known to contribute to the formation of active cephalosporin antibiotic substances. For example, these nuclei can be acylated with 2-thienylacetyl chloride (analogous to chephalothin, a known antibiotic) or with the N-protected activated form of phenylglycine with subsequent removal of the N-protecting and ester groups (analogous to the procedures used in synthesizing cephaloglycin and cephalexin, known oral cephalosporin antibiotics), to form the corresponding 2-thiomethyl-$\Delta^3$-cephalosporanic acid or 2-thiomethylene-$\Delta^3$-cephalosporanic acid derivatives which exhibit substantial antibiotic activity against a variety of Gram positive microorganisms. Thus, for example, the compounds 2-phenylthiomethyl-3-methyl-7-(2'-thienylacetamido)-$\Delta^3$-cephem-4-carboxylic acid, and 2 - (4'-chlorophenylthiomethyl)-3-methyl-7-D-$\alpha$-amino-$\alpha$-phenylacetamido)-$\Delta^3$-cephem-4-carboxylic acid zwitterion can be prepared from nuclei compounds of the above type.

Representative examples of such new compounds include the nuceli compounds, that is, the compounds having a free 7-amino group, esters thereof, and salts of such compounds, e.g., 7-amino-3-methyl-2-methylthiomethyl-$\Delta^3$-cephem-4-carboxylic acid, inner salt;

7-amino-3-methyl-2-phenylthiomethyl-$\Delta^3$-cephem--carboxylic acid, p-toluenesulfonate salt;

7-amino-3-acetoxymethyl-2-(4-chlorophenylthiomethyl)-$\Delta^3$-cephem-4-carboxylic acid, naphthalenesulfonate salt;

7-amino-3-propionoxymethyl-2-(2'-hydroxyethylthiomethyl)-$\Delta^3$-cephem-4-carboxylic acid, methanesulfonate salt;

2,2,2-trichloroethyl 7-amino-2-allylthiomethyl-3-methyl-$\Delta^3$-cephem-4-carboxylate p-nitrobenzyl-7-amino-2-(1-decylthiomethyl)-3-methoxymethyl-$\Delta^3$-cephem-4-carboxylate;

tert-butyl 7-amino-2-prophynylthiomethyl-3-acetoxymethethyl-$\Delta^3$-cephem-4-carboxylate, p-toluenesulfonate salt;

tert-pentynyl 7-amino-2-benzylthiomethyl-3-acetoxy-methyl-$\Delta^3$-cephem-4-carboxylate;

trimethylsilyl 7-amino-2-(4'-bromophenylthiomethyl)-3-methyl-$\Delta^3$-cephem-4-carboxylate biphenylsulfonate salt;

phenacyl 7-amino-2-(1'-napthylthiomethyl)-3-acetoxymethyl-$\Delta^3$-cephem-4-carboxylate;

benzyl 7-amino-2-cyclohexylthiomethyl-3-acetoxymethyl-$\Delta^3$-cephem-4-carboxylate, p-toluenesulfonate salt, and the like.

It will be obvious to those skilled in the art that the ester groups can be removed by hydrogenation or by treating the compound with zinc in formic or acetic acid, with trifluoroacetic acid, or with aqueous acid to obtain the corresponding 7-amino-2-thiomethyl ether cephalosporanic acid nucleus, either as the inner salt or as the salt of an appropriate acid at an amino group. Salts at the carboxylic acid group with bases such as sodium, potassium can also be prepared.

Examples of new 2-thiomethyl ether cephalosporin sulfoxide acids and esters of this invention having the 7-amino group protected with an acyl group include:

2-methylthiomethyl-3-methyl-7-(phenoxyacetamido)-
  $\Delta^3$-cephem-4-carboxylic acid,
2-benzylthiomethyl-3-methoxymethyl-7-phenylacetamido-
  $\Delta^3$-cephem-4-carboxylic acid,
2-(4'-bromophenylthiomethyl)-3-acetoxymethyl-7-(D-$\alpha$-amino-$\alpha$-phenylacetamido)-$\Delta^3$-cephem-4-carboxylic acid,
2-dodecylthiomethyl-3-methyl-7-(2'-thienylacetamido)-
  $\Delta^3$-cephem-4-carboxylic acid,
2,2,2-trichloroethyl 2-allylthiomethyl-3-methyl-7-phenylhexanoylamido-$\Delta^3$-cephem-4-carboxylate,
4-nitrobenzyl 2-cyclohexylthiomethyl-3-hexanoyloxymethyl-7-benzylacetamido-$\Delta^3$-cephem-4-carboxylate,
tert-butyl 2-bornylthiomethyl-3-methyl-7(3'-chlorophenylbutanoylamido)-$\Delta^3$-cephem-4-carboxylate, and the like.

Examples of the new 2-thiomethylene-$\Delta^3$-cephalosporin ester and acid compounds of this invention include:

tert-butyl 3-methyl-2-propylthiomethylene-7-(D-$\alpha$-amino-$\alpha$-phenylacetamido)-$\Delta^3$-cephem-4-carboxylate;
2,2,2-trichloroethyl 3-acetoxymethyl-2-(cyclohexylthiomethylene)-7-(D-$\alpha$-amino-$\alpha$-thienylacetamido)-$\Delta^3$-cephem-4-carboxylate;
tert-pentynyl 3-methoxymethyl-2-(2'-phenylethylthiomethylene)-7-(2'-thienylacetamido)-$\Delta^3$-cephem-4-carboxylate;
phenacyl 3-methylthiomethyl-2-(3'-cyclopentynylthiomethylene)-7-(2'-cyanoacetamido)-$\Delta^3$-cephem-4-carboxylate;
thenoylmethyl 3-methyl-2-(norborn-5-enylthiomethylene)-7-(3'-chlorophenoxyacetamido)-$\Delta^3$-cephem-4-carboxylate;
p-nitrobenzyl 3-methylthiomethyl-2-(phenylethylthiomethylene)-7-(D-$\alpha$-amino-$\alpha$-phenylacetamido)-$\Delta^3$-cephem-4-carboxylate,
7-amino-2-naphthylthiomethylene-3-methyl-$\Delta^3$-cephem-4-carboxylic acid zwitterion,
7-amino-2-(2'-thenylmethylthiomethylene)-3-acetoxymethyl-$\Delta^3$-cephem-4-carboxylic acid·p-toluenesulfonate salt, and the like.

The following detailed examples illustrate representative procedures used to prepare the compounds of this invention. Melting points are in degrees centigrade and uncorrected. Nuclear magnetic resonance (NMR) spectra were recorded on Varian A-60, HA-60 or HA-100 spectrometers. Elemental analyses were determined by microanalytical methods.

Preparation of the "2-methylene sulfoxide" starting materials, e.g., 2,2,2-trichloroethyl 3-methyl-7-(phenoxyacetamido)-$\Delta^3$-cephem-4-carboxylate-1-oxide

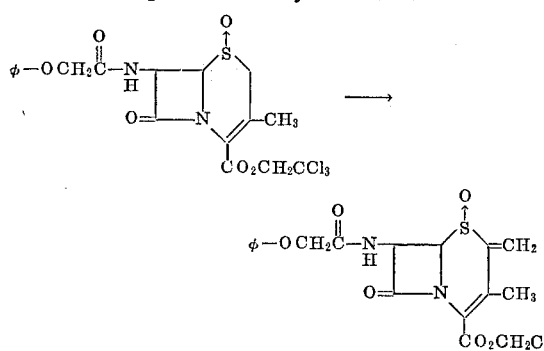

2,2,2 - trichloroethyl 7 - phenoxyacetamido-3-methyl-$\Delta^3$-cephem-4-carboxylate-1-oxide (15.0 gm., 30.3 mmoles) was dissolved in a small volume of hot methylene chloride (50 ml.) and formaldehyde (3.0 gm. of 37 percent aqueous solution, 37 mmoles) and dimethylamine hydrochloride (2.46 gm., 30.2 mmoles) were added with t-butyl alcohol (500 ml.). The mixture was allowed to reflux on the steam bath for 24 hours, then the condenser was removed and the reaction mixture was concentrated to 300 ml. On cooling, the 2-methylene sulfoxide separated as fine, light yellow needles (13.0 gm., M.P. 173–4° (d.), 84.6 percent yield). Concentration of the mother liquors yielded a small second crop (1.6 gm., total yield 95.0 percent). Generally, this material was sufficiently pure for use in subsequent reactions.

Recrystallization from methylene-chloride-t-butyl alcohol raised the melting point slightly to 177–8° (d.).

The structure of the 2-methylene sulfoxide was deduced from elemental analysis ($C_{19}H_{17}N_2O_6Cl_3S$) and spectral data. In particular, the UV spectrum shows absorption due to the extended chromophore at 313 m$\mu$ (E=5000), and the NMR spectrum shows no signals at J=3.30 and 3.65 (J=194Z) due to the 3-protons as in the spectrum of the starting material, but does show two new signals at J=6.10 and 6.24 delta due to the 2''-protons.

The same type of reaction has been carried out with:

2,2,2-trichloroethyl 3-acetoxymethyl-7-phenoxyacetamido-$\Delta^3$-cephem-4-carboxylate-1-oxide,
p-methoxybenzyl 3-methyl-7-phenoxyacetamido-$\Delta^3$-cephem-4-carboxylate-1-oxide,
t-butyl 3-methyl-7-phenoxyacetamido-$\Delta^3$-cephem-4-carboxylate-1-oxide,
t-butyl 3-hydroxymethyl-7-phenoxyacetamido-$\Delta^3$-cephem-4-carboxylate-1-oxide,
4-nitrobenzyl 3-acetoxymethyl-7-(2'-thienylacetamido)-$\Delta^3$-cephem-4-carboxylate-1-oxide,
2,2,2-trichloroethyl 3-acetoxymethyl-7-(2'-thienylacetamido)-$\Delta^3$-cephem-4-carboxylate-1-oxide,
4-nitrophenacyl 3-acetoxymethyl-7-(2'-thienylacetamido)-$\Delta^3$-cephem-4-carboxylate-1-oxide,
tert-butyl 3-acetoxymethyl-7-(2'-thienylacetamido)-$\Delta^3$-cephem-4-carboxylate-1-oxide.

EXAMPLE 1

2,2,2-trichloroethyl 2-(benzylthiomethyl-3-methyl)-7-phenoxyacetamido-3-cephem-4-carboxylate-1-oxide 2,2,2-trichloroethyl 2-methylene-3-methyl-7 - phenoxyacetamido-$\Delta^3$-cephem-4 - carboxylate - 1 - oxide (1.0 gm., 1.975 mmoles) was dissolved in acetic acid (30 ml.) containing sodium acetate (164 mg.) and benzyl mercaptan (495 mg., 40 mmoles) and stirred at room temperature for 30 minutes. The solvent was removed in vacuo, the residue was shaken with a mixture of water and methylene chloride, and the material in the organic layer was chromatographed on silica gel (Woelm Act. I, 80 gm.) using a linear elution gradient (0 to 100 percent ethyl acetate in benzene, 2 liters). The non-crystalline product, 2,2,2-trichloroethyl 2-(benzylthiomethyl) - 3 - methyl-7-phenoxyacetamido-$\Delta^3$-cephem-4-carboxylate-1 - oxide (1.2 gm., 98 percent yield) was identified by spectral analytical methods. In particular, loss of the 313 millimicron absorption in the ultraviolet spectrum indicated saturation of the terminal (exo-methylene) double bond; and loss of the vinyl hydrogen signals at 6.10 and 6.24 delta with concomitant appearance of new signals due to the benzyl group (5H singlet at 7.33 delta 2H singlet at 3.75 delta) and the coupled methylene-methine system (complex 3H multiplet from 1.8 to 3.9 delta) between the two sulfur atoms indicated attachment of the benzyl group.

EXAMPLE 2

2,2,2-trichloroethyl 2-(benzylthiomethylene)-3-methyl-7-(phenoxyacetamido)-$\Delta^3$-cephem-4-carboxylate When the same reaction mixture as in Example 1 (containing the 2,2,2-trichloroethyl 2-(benzylthiomethyl)-

3-methyl-7-phenoxyacetamido-Δ³-cephem-4 - carboxylate-1-oxide and sodium acetate in acetic acid) was allowed to stand at room temperature for 24 to 96 hours, thin layer chromatographic analysis of samples thereof indicated a conversion of the sulfoxide-ester to a new sulfide ester, identified as 2,2,2-trichloroethyl 2-(benzylthiomethylene)-3-methyl-7-phenoxyacetamido - Δ³ - cephem-4-carboxylate, after separation by chromatography and identification by spectral analyses. The extended unsaturated chromophore absorbs at 363 millimicrons ($\epsilon$=17,200) in the UV spectrum. The nuclear magnetic resonance spectrum shows benzyl group signals and no signals due to the coupled methylene-methine system of the starting material. The vinyl hydrogen signal is masked by aromatic absorption between 6.8 and 7.5 delta.

EXAMPLE 3

2,2,2-trichloroethyl 2 - (4 - bromophenylthiomethyl) - 3-methyl-7-(phenoxyacetamido)-3-cephem - 4 - carboxylate-1-oxide 2,2,2-trichloroethyl 3-methyl-2-methylene - 7 - phenoxyacetamido-3-cephem-4-carboxylate - 1 - oxide (507 mg., 1.00 mmole), and 4-bromothiophenol (189 mg., 100 mmoles) was dissolved in 100 ml. of methylene chloride. The solution was stirred for 2 hours at room temperature and then evaporated to dryness in vacuo. The crude solid material was recrystallized from hot isopropanol to give 605 mg., 87 percent, of the title 1:1 adduct: M.P. 148–149°. The structure was confirmed by infrared (IR), ultraviolet (UV), nuclear magnetic resonance (NMR) spectra, and the elemental analysis given below.

*Analysis.*—Calcd. for $C_{25}H_{22}BrCl_3N_2O_6S_2$ (percent): C, 43.08; H, 3.18; Br, 11.47; Cl, 15.26; N, 4.02; S, 9.20. Found (percent): C, 43.23; H, 3.40; Br, 11.66; Cl, 15.30; N, 4.27; S, 8.98.

EXAMPLE 4

2,2,2-trichloroethyl 2-(4-bromophenylthiomethylene)-3-methyl-7-(phenoxyacetamido)-Δ³-cephem-4-carboxylate 2,2,2-trichloroethyl 2-(4 - bromophenylthiomethyl)-3-methyl-7-(phenoxyacetamido) - Δ³ - cephem - 4 - carboxylate-1-oxide (3.34 gm., 4.80 mmoles) was dissolved in 150 ml. of acetic acid. Sodium acetate (500 mg., 6.1 mmoles) was added, and the resulting solution was stirred for 72 hours at room temperature. The acetic acid was removed in vacuo, and the residue was taken up in 150 ml. of ethyl acetate. The organic layer was thoroughly washed with water and dried over anhydrous MgSO₄. Removal of the solvent yielded 3.20 gm., 93 percent of the crude above title product, which was purified by column chromatography ("Florisil" brand magnesium silicate support eluting with 20 percent ethyl acetate, 80 percent methylene chloride). The chromatographed title compound (60 percent recovery) was recrystallized from hot isopropyl alcohol: M.P. 158–160°. The structure was confirmed by IR, UV, and NMR spectral analyses, and by the elemental analysis given below.

*Analysis.*—Calcd. for $C_{25}H_{20}N_2O_5BrCl_3S_2$ (percent): C, 44.23; H, 2.97; N, 4.13; S, 9.45; Cl, 15.67; Br, 11.77. Found (percent): C, 44.22; H, 3.10; N, 4.39; S,9.64; Cl, 15.94; Br, 11.63.

EXAMPLE 5

2,2,2-trichloroethyl 2-(ethylthiomethylene)-3-methyl-7-(phenoxyacetamido)-Δ³-cephem-4-carboxylate 2,2,2-trichloroethyl 2-methylene-3-methyl-7 - (phenoxyacetamido)-Δ³-cephem-4-carboxylate-1-oxide (5.0 g., 9.8 mmoles) was dissolved in 75 ml. of acetic acid and 30 ml. of ethyl mercaptan. The solution was stirred overnight at 45° and then evaporated to dryness in vacuo. The residue was taken up in hot isopropanol and allowed to crystallize. The crude product was recrystallized from isopropanol to give 1.9 gm., 37 percent, of pure 2,2,2-trichloroethyl 2-(ethylthiomethylene)-3-methyl - 7 - (phenoxyacetamido)-Δ³-cephem-4-carboxylate; M.P. 155–156°.

The structure was confirmed by IR, UV, and NMR spectral analyses and by the elemental analyses given below.

*Analysis.*—Calcd. for $C_{21}H_{21}Cl_3N_2O_5S_2$ (percent): C, 45.70; H, 3.84; Cl, 19.27; N, 5.08; S, 11.62. Found (percent): C, 45.50; H, 3.81; Cl, 19.71; N, 4.93; S, 11.80.

EXAMPLE 6

2,2,2 - trichloroethyl 2-(4'-bromophenylthiomethylene)-3-methyl - 7 - amino-Δ³-cephem-4-carboxylate, p-toluenesulfonate salt 2,2,2-trichloroethyl 2-(4'-bromophenylthiomethylene)-3 - methyl - 7 - (phenoxyacetamido)-Δ³-cephem-4-carboxylate (3.12 gm., 4.6 mmoles) was dissolved in 150 ml. benzene containing pyridine (540 mg., 6.8 mmoles). The solution was placed in a water bath at 65°, and phosphorus pentachloride (1.40 gm., 6.8 mmoles) was added. The mixture was stirred under nitrogen for 2.5 hours at 65°. After cooling to room temperature, the flask contents were evaporated to dryness in vacuo. Anhydrous methanol (250 ml.), was added, and the solution was stirred at room temperature overnight.

The methanol was removed in vacuo, and the residue was dissolved for 50 ml. of water and 50 ml. of tetrahydrofuran (THF) and stirred for 15 minutes at room temperature. The THF was removed in vacuo. Ethyl acetate (100 ml.) was added to the residue and the pH of the resulting slurry was adjusted to 6.5. The organic layer containing the 2,2,2-trichloroethyl 2-(4'-bromophenylthiomethylene) - 3 - methyl-7-amino-Δ³-cephem-4-carboxylate was washed with water and dried over anhydrous MgSO₄. p-Toluenesulfonic acid monohydrate (875 mg., 4.6 mmoles) dissolved in 25 ml. of ethyl acetate was added to the solution, and 2.00 gm., 66 percent, of the above titled salt precipitated; M.P. 179–182°. The structure was confirmed by IR, UV, and NMR spectral analyses.

EXAMPLE 7

2,2,2 - trichloroethyl 2-(4-bromophenylthiomethylene)-3-methyl - 7 - (phenylmercaptoacetamido)-Δ³-cephem-4-carboxylate 2,2,2 - trichloroethyl 2-(4-bromophenylthiomethylene)-3-methyl-7-amino-Δ³-cephem-4-carboxylate, tosylate salt (2.10 gm., 2.94 mmoles) was suspended in a slurry of 50 ml. of ethyl acetate and 50 ml. water. The pH was adjusted to 7 liberating the free amine. The ethyl acetate layer was washed with water and dried (MgSO₄). Removal of solvent in vacuo gave the amine as a yellow oil.

The oil was dissolved in 50 ml. of dry acetone and urea (354 mg., 5.88 mmoles) was added. The resulting suspension was stirred at room temperature while phenylmercaptoacetyl chloride (546 mg., 2.94 mmoles) in 25 ml. of dry acetone was added dropwise over a period of 15 minutes. Stirring was continued for an additional 0.5 hour. By this time, all the urea had dissolved. The acetone was removed in vacuo; the residue was dissolved in ethyl acetate and washed with 5 percent aqueous hydrochloric acid, saturated aqueous sodium bicarbonate, and then with water. After drying (MgSO₄) the ethyl aceate solution was evaporated to dryness to give the title product (1.90 gm., 93 percent) as a viscous oil which readily crystallized from hot isopropanol, M.P. 131–132°.

EXAMPLE 8

2 - (4 - bromophenylthiomethylene) - 3 - methyl-7-(phenoxyacetamido)-Δ³-cephem-4-carboxylic acid 2,2,2 - trichloroethyl 2-(4-bromophenylthiomethylene)-3-methyl - 7 - (phenoxyacetamido)-Δ³-cephem-4-carboxylate (950 mg., 1.40 mmoles) was dissolved in 15 ml. of dimethylforamide. Acetic acid (3.0 ml.) was added, and the solution was cooled to 0°. Zinc dust (975 mg., 15.0 mmoles) was added, and the resulting mixture was stirred in an ice water bath for 1.5 hours. The zinc was filtered, and the solution was poured into a slurry of 100 ml. of ethyl acetate and 100 ml. of water. The organic layer was separated and washed twice with 100 ml. portions of water. It was then stirred in a beaker with 100 ml. of water and the pH was adjusted to 8. The aqueous layer was separated, placed in a beaker with 100 ml. of ethyl acetate, and the pH was adjusted to 3. The ethyl acetate layer was separated, washed with water, and dried over anhydrous $MgSO_4$. Removal of the solvent in vacuo yielded 570 mg., 74 percent, of the title acid which was recrystallized from hot isopropanol: M.P. 196–197° C. The structure was confirmed by IR, UV, and NMR spectral analyses and by the elemental analysis given below:

Analysis.—Calcd. for $C_{23}H_{19}BrN_2O_5S_2$ (percent): C, 50.45; H, 3.49; Br, 14.59; N, 5.11; S, 11.71. Found (percent): C, 50.26; H, 3.70; Br, 14.81; S, 11.81.

EXAMPLE 9

3-methyl-2-(phenylthiomethylene)-7-(phenoxyacetamido)-$\Delta^3$-cephem-4-carboxylic acid Following the procedure in Example 8, the title acid compound (M.P. 177–8°) was prepared from its 2,2,2-trichloroethylester, which was prepared in a manner similar to that used in Example 2, using thiophenol in place of benzyl mercaptan.

The compound structure was confirmed by IR, UV, and NMR spectral analyses, and the following elemental analysis.

Analysis.—Calcd. for $C_{23}H_{20}N_2O_5S_2$ (percent): C, 58.97; H, 4.30; N, 5.98; S, 13.69. Found (percent): C, 58.67; H, 4.35; N, 5.77; S, 13.50.

EXAMPLE 10

2 - benzylthiomethylene-3-methyl-7-(phenoxyacetamido)-$\Delta^3$-cephem-4-carboxylic acid Following the procedure of Example 8, the title acid compound (M.P. 180–2°) was prepared from its 2,2,2-trichloroethyl ester, which was prepared as in Example 2. The compound structure was confirmed by IR, UV, and NMR spectral analysis and the following elemental analysis.

Analysis.—Calcd. for $C_{24}H_{22}N_2O_5S_2$ (percent): C, 59.72; H, 4.59; N, 5.80; S, 13.28; Found (percent): C, 59.55; H, 4.63; N, 6.00; S, 13.53.

EXAMPLE 11

3-acetoxymethyl-2-(benzylthiomethylene)-7-(2'-thienylacetamido)-$\Delta^3$-cephem-4-carboxylic acid The starting material, 2,2,2-trichloroethyl 3-acetoxy methyl - 2-methylene-7-(2'-thienylacetamido)-$\Delta^3$-cephem-4-carboxylate-1-oxide was prepared by esterifying cephalothin [7 - (2' - thienylacetamido)cephalosporanic acid] (U.S. Pat. 3,218,318) with 2,2,2-trichloroethanol in the presence of dicyclohexylcarbodiimide, followed by treatment with meta-chloroperbenzoic acid to form the sulfoxide, and then with formaldehyde in the presence of dimethylamine hydrochloride to form the 2-methylene sulfoxide ester compound as detailed above in the "Preparation of the Starting Materials."

Then, following the procedure of Example 2, the 2,2,2-trichloroethyl 3-acetoxymethyl-2-methylene-7-(2'-thienylacetamido)-$\Delta^3$-cephem-4-carboxylate-1-oxide was reacted with benzyl mercaptan in the presence of acetic acid and sodium acetate and deesterified according to Example 8, to form 3-acetoxymethyl-2-(benzylthiomethylene)-7-(2'-thienylacetamido)-$\Delta^3$-cephem-4-carboxylic acid (M.P. 144–5°).

The compound structure was confirmed by IV, UV, and NMR spectral analyses, and the following elemental analysis:

Analysis.—Calcd. for $C_{24}H_{22}N_2O_6S_3$ (percent): C, 54.32; H, 4.18; N, 5.28; S, 18.12. Found (percent): C, 54.09; H, 4.37; N, 5.21; S, 18.27.

EXAMPLE 12

3-acetoxymethyl-2-(4-chlorophenylthiomethylene)-7-(2'-thienylacetamido)-$\Delta^3$-cephem-4-carboxylic acid The title acid compound (M.P. 220–2°) was prepared in a manner similar to that described in Example 11 using 4-chlorothiophenol in place of benzyl mercaptan.

The compound structure was confirmed by IR, UV, and NMR analysis, and the following elemental analysis:

Analysis.—Calcd. for $C_{23}H_{19}ClN_2O_6S_3$ (percent): C, 50.13; H, 3.48; Cl, 6.43; N, 5.08; S, 17.46. Found (percent): C, 50.26; H, 3.60; Cl, 6.41; N, 4.88; S, 17.22.

EXAMPLE 13

2-(methylthiomethylene)-3-methyl-7-(phenoxyacetamido)-$\Delta^3$-cephem-4-carboxylic acid The title acid compound (M.P. 198–199°) was prepared in a manner silimar to that described in Examples 5 and 8 using methyl mercaptan in place of ethyl mercaptan. The compound structure was confirmed by IR, UV, and NRM spectral analyses, and the elemental analysis given below:

Analysis.—Calcd. for $C_{18}H_{18}N_2O_5S_2$ (percent): C, 53.18 H, 4.46; N, 6.89; S, 15.78. Found (percent): C, 52.90; H, 4.54; N, 6.63; S, 15.73.

EXAMPLE 14

2-(ethylthiomethylene)-3-methyl-7-(phenoxyacetamido)-$\Delta^3$-cephem-4-carboxylic acid The title acid compound (M.P. 186–70°) was prepared from the ester prepared in Example 5 in the manner similar to that described in Example 8. The compound structure was confirmed by IR, UV, and NMR analyses, and the elemental analysis given below:

Analysis.—Calcd. for $C_{19}H_{20}N_2O_5S_2$ (percent): C, 54.27; H, 4.79; N, 6.62; S, 15.25. Found (percent): C, 54.56; H, 4.90, N, 6.73; S, 15.05.

EXAMPLE 15

3-methyl-2-(2'pyrimidinylthiomethylene)-7-(phenoxyacetamido)-$\Delta^3$-caphem-4-carboxylic acid The title acid compound (M.P. 237–8°) was prepared in a manner similar to that described in Examples 2 and 8 using 2-mercaptopyrimidine in place of the benzyl mercaptan in Example 2. The compound structure was confirmed by IR, UV, and NMR analyses and the elemental analysis given below:

Analysis.—Calcd. for $C_{21}H_{18}N_4O_5S_2$ (percent): C, 53.62; H, 3.86; N, 11.91; S, 13.63. Found (percent): C, 53.70; H, 3.95; N, 11.97; S, 13.55.

EXAMPLE 16

2-[3'-(carbomethoxyphenyl)thiomethylene-3-methyl-7-(phenoxyacetamido)-$\Delta^3$-cephem-4-carboxylic acid The title acid compound (M.P. 206–8°) was prepared in a manner similar to that described in Examples 2 and 8 using 3-carbomethoxyphenyl mercaptan in place of benzyl mercaptan. The compound structure was confirmed by IR,, UV, and NMR analyses, and the elemental analysis given below:

Analysis.—Calcd. for $C_{25}H_{22}N_2O_7S_2$ (percent): C, 57.02; H, 4.21; N, 5.32; S, 12.18. Found (percent): C, 56.79; H, 4.50; N, 5.26; S, 12.13.

EXAMPLE 17

2-(4'-bromophenylthiomethylene)-3-methyl-7-(phenylmercaptoacetamido)-$\Delta^3$-cephem-4-carboxylic acid The title acid compound (M.P. 203–5°) was prepared following the procedures of Examples 2, 6 and 7 to prepare the ester and Example 8 to remove the ester group. The compound structure was confirmed by IR, UV, and NMR analyses, and the elemental analysis given below:

Analysis—Calcd. for $C_{23}H_{29}N_2O_4BrS_3$ (percent): C, 49.02; H, 3.40; N, 4.97. Found (percent): C, 49.20; H, 3.44; N, 4.97.

EXAMPLE 18

2,2,2-trichloroethyl 2 - (2' - hydroxyethylthiomethyl)-3-methyl-7-phenoxyacetamido-$\Delta^3$-cephem - 4-carboxylate-1-oxide The title compound (M.P. 135–8°, from benzene) was prepared according to the procedure in Example 3 using 2-mercaptoethanol in place of the 4-bromothiophenol. The structure was confirmed by IR, UV, and NMR spectral analyses, and by the elemental analysis given below:

*Analysis.*—Calcd. for $C_{21}H_{23}N_2O_7Cl_3S_2$ (percent): C, 43.04; H, 3.95; N, 4.78; S, 10.94; Cl, 18.15. Found (percent): C, 43.08; H, 4.24; N, 4.54; S, 11.12; Cl, 18.02.

EXAMPLE 19

2,2,2 - trichloroethyl 2 - (carboxymethylthiomethyl)-3-methyl-7-phenoxyacetamido-$\Delta^3$-cephem - 4-carboxylate-1-oxide The title compound (M.P. 163–4° from methylene chloride) was prepared according to Example 3 using thioglycollic acid in place of 4-bromothiophenol. The compound structure was confirmed by IR, UV, and NMR spectral analyses, and by the elemental analysis given below:

*Analysis.*—Calcd. for $C_{21}H_{21}O_8N_2Cl_3S_2$ (percent): C, 42.04; H, 3.53; N, 4.67; S, 10.09; Cl, 17.73. Found (percent): C, 41.89; H, 3.59; N, 4.71; S, 10.36; Cl, 17.71.

EXAMPLE 20

2,2,2-trichloroethyl 3-acetoxymethyl-2-(4' - bromophenylthiomethyl) - 7 - (2' - thienylacetamido)-$\Delta^3$-cephem-4-carboxylate-1-oxide 2,2,2-trichloroethyl- 3-acetoxymethyl - 7 - (2' - thienyl acetamido) - 2 - methylene-$\Delta^3$-cephem-4-carboxylate-1-oxide (10.0 gm., 0.018 mole) was dissolved in 500 ml. of dichloromethane and cooled to −80°. A solution of 4-bromophenylthiol (3.40 gm./0.018 mole) dissolved in 100 ml. dichloromethane was added dropwise with stirring to the solution over a period of 30 minutes while the temperature was maintained at −80°. The resulting solution was stirred for one hour while allowed to approach room temperature. Then it was concentrated to about 80 ml. in vacuo and poured into hot isopropanol. Upon cooling, the product crystallized (11.2 gm./84 percent): M.P. 150–151°. The compound structure was confirmed by IR, UV, and NMR analyses, and by the elemental analysis:

*Analysis.*—Calcd. for $C_{25}H_{22}BrCl_3N_2O_7S_3$ (percent): C, 40.31; H, 2.98; N, 3.76; S, 12.91. Found (percent): C, 40.25; H, 3.06; N, 3.98; S, 12.76.

EXAMPLE 21

3-acetoxymethyl - 2 - (4'-bromophenylthiomethyl)-7-(2'-thienylacetamido) - $\Delta^3$ - cephem - 4 - carboxylic acid-1-oxide 2,2,2-trichloroethyl 3 - acetoxymethyl-2-(4'-bromophenylthiomethyl) - 7 - (2' - thienylacetamido)-$\Delta^3$-cephem-4-carboxylate-1-oxide (4.0 gm./5.4 mmoles) was dissolved in a stirred solution of 50 ml. DMF and 8 ml. of glacial acetic acid and cooled to −5°. Zinc dust (4.0 gm./61 mmoles) was added to the solution with a spatula, and the resulting mixture was stirred at −5° for 75 minutes. The zinc was filtered by suction and washed with 200 ml. ethyl acetate. The filtrate plus ethyl acetate was washed with water to remove the DMF, dried (MgSO$_4$), and evaporated in vacuo to give 2.5 gm./75 percent, of the desired acid, which crystallized from hot ethyl acetate: M.P. 185–186°. The compound structure was confirmed by spectral analysis.

EXAMPLE 22

4-nitrobenzyl 2-(4' - bromophenylthiomethyl)-3-acetoxymethyl-7-(2'-thienylacetamido) - $\Delta^3$ - cephem-4-carboxylate-1-oxide An 11.2 gm. (0.02 mole) portion of 4-nitrobenzyl 3-acetoxymethyl - 2 - methylene-7-thienylacetamido-$\Delta^3$-cephem-4-carboxylate-1-oxide was suspended in 1500 ml. of methylene chloride and stirred in an ice water bath while 3.78 gm./(0.02 mole) of 4-bromothiophenol in 200 ml. of methylene chloride was added dropwise over 1 hour. The solution was stirred for 2 hours in the cold to insure complete reaction, after which time the solvent was removed in vacuo, and the residue, 4-nitrobenzyl 2-(4'-bromophenylthiomethyl) - 3 - acetoxymethyl-7-(2'-thienylacetamido)-$\Delta^3$-cephem - 4 - carboxylate - 1 - oxide, was crystallized from hot isopropanol, M.P. 123–124° in 92 percent yield (14.6 gm.). The structure was confirmed by UV, IR, and NMR spectral analyses:

*Analysis.*—Calcd. for $C_{30}H_{26}BrN_3O_9S_3$ (percent): C, 48.12; H, 3.48; N, 5.61; S, 12.85; Br, 10.68. Found (percent): C, 47.94; H, 3.53; N, 5.82; S, 12.65; Br, 10.52.

EXAMPLE 23

4-nitrobenzyl 2-(4'-bromophenylthiomethyl)-3-acetoxymethyl-7-(2'-thienylacetamido-$\Delta^3$-cephem-4-carboxylate A 2.0 gm. (2.7 millimole) portion of 4-nitrobenzyl 2-4' - bromophenylthiomethyl) - 3 - acetoxymethyl - 7 - (2'-thienylacetamido) - $\Delta^3$ - cephem - 4 - carboxylic - 1-oxide prepared as described in Example 22, was added to a cold (0°–5° ice-water bath) solution of N,N-dimethylformamide containing 4 ml. of acetyl chloride and 1.2 gm. (5 mmoles) of sodium iodide. The resulting suspension was stirred at 0°–5° for 45 minutes at which time the suspension was poured into 500 ml. of saturated sodium chloride solution. This mixture was then extracted five times with 80 ml. portions of methylene chloride. The methylene chloride extracts were combined, washed two times with 50 ml. portions of 10 percent sodium thiosulfate (Na$_2$S$_2$O$_3$) solution, followed by washing five times with 100 ml. portions of water. The organic layer was dried over magnesium sulfate and the solvent was then removed under vacuum to leave as residue 1.8 gm. (93 percent yield of reduced material which was isolated as an oil. Thin layer chromatographic analysis, using a 1:1 by volume mixture of benzene and ethyl acetate as eluate, indicated conversion to the 4-nitrobenzyl 2-(4'-bromophenylthiomethyl) - 3 - acetoxymethyl - 7 - (2'-thienylacetamido) - $\Delta^3$ - cephem - 4 - carboxylate. The R$_f$ of the sulfoxide ester product was 0.8 wherein the R$_f$ of the sulfoxide ester product was 0.7. Nuclear magnetic resonance spectral analysis clearly showed conversion to the sulfide by the shift in the C–7 proton to 5.85 delta from 6.02 delta which is in full agreement with data of known reduction processes of cephalosporins.

EXAMPLE 24

2-(4'-bromophenylthiomethyl)-3-acetoxymethyl-7-(2'-thienylacetamido)-$\Delta^3$-cephem-4-carboxylic acid 4 - nitrobenzyl 2 - (4' - bromophenylthiomethyl) - 3-acetoxymethyl - 7 - (2' - thienylacetamido) - $\Delta^3$ - cephem-4-carboxylate (7.0 gm., 9.7 mmoles) prepared as described in Example 23, was dissolved in 80 percent acetonitrile-water (40 ml.) and cooled to 0° to 5° in an ice bath. While maintaining the pH at 1.5 with concentrated hydrochloric acid zinc metal dust (7.0 gm.) was added in one-half gram portions with continuous stirring over 30 minutes. After stirring the suspension for one-half hour after addition of the zinc, the liquid was decanted away from the metal and added to 400 ml. of water. The aqueous mixture was then extracted three times with 200 ml. portions of ethyl acetate. The organic extracts were combined, washed once with 300 ml. of water, dried over magnesium sulfate, and then the solvent was removed in vacuo to give 5.1 gm. of 2-(4'-bromophenylthiomethyl) - 3 - acetoxymethyl - 7 - (2' - thienylacetamido) - $\Delta^3$ - cephem - 4 - carboxylic acid. This acid was obtained as an oil and was fully characterized by formation of its methyl ester, by reaction with diazomethane in methylene chloride at 0° in an ice-water bath. The crystalline ester, methyl 2-(4'-bromomethylthiomethyl)-3 - acetoxymethyl - 7 - (2' - thienylacetamido) - Δ³-cephem-4-carboxylate had melting point of 112–113°. The structure was confirmed by IR, UV, and NMR spectral data and by the elemental analysis:

*Analysis.*—Calcd. for $C_{24}H_{23}BrN_2O_6S_3$ (percent): C, 47.13; H, 3.79; N, 4.58; S, 15.73; Br, 13.07. Found (percent): C, 47.38; H, 3.99; N, 4.81; S, 15.73; Br, 13.29.

The 2-thiomethyl and 2-thiomethylene-Δ³-cephem-4-carboxylic acid compounds of this invention, obtained by removing the ester group by methods now known, are active antibiotics against penicillin resistant Gram-positive micro-organisms. Antibiotic activities of representative compounds of this invention are summarized in the following table. The first group of test compounds have the general Formula X (X)
$$R-NH-CH-CH \begin{array}{c} S \\ \diagup \diagdown \end{array} C=CH-S-R'''$$
$$O=C-H \qquad C-CH_2-X$$
$$\diagdown C \diagup$$
$$COOH$$

where R, X and R''' are as defined in the indictated examples. The last compound is an example of those compounds having the Formula XI (XI)
$$R-NH-CH-CH \begin{array}{c} S \quad H \\ \diagup \diagdown \diagup \end{array}$$
$$\qquad \qquad C-CH_2-S-R'''$$
$$O=C-N \qquad C-CH_2-X$$
$$\diagdown C \diagup$$
$$COOH$$

wherein R, X, and R''' are as defined in the example.

IN VITRO PENICILLIN G RESISTANT STAPHYLOCOCCI

|  | $V_{30}$ | $V_{32}$ | $V_{40}$ | $V_{84}$ |
|---|---|---|---|---|
| Sodium cephalothin | 0.4/1.0 | 0.4/1.0 | 19.0/16.5 | 0.3/1.0 |
| Example: |  |  |  |  |
| 9 | 28.3/78 | 24.1/>100 | 60.0/>100 | 10.0/65.0 |
| 10 | 5.6/60.0 | 6.2/88.0 | 49.0/>100 | 5.4/50.0 |
| 12 | 4.3/>100 | 14.1/>100 | 72.0/>100 | 10.1/77.0 |
| 8 | 13.4/70.0 | 17.9/>100 | 46.7/>100 | 10.0/60.0 |
| 13 | 13.4/40.0 | 8.8/52.0 | 55.0/64.0 | 6.1/34.0 |
| 15 | 4.1/42.5 | 3.6/38.0 | 60.0/640 | 4.0/37.5 |
| 16 | 12.1/60 | 9.8/65 | 60.0/>100 |  |
| 24 | 0.6/>100 | 0.62/>100 | 27.0/>100 | 0.6/>100 |

NOTE: Test by gradient plate procedure, described in Science, 116, Pa. 45–51 (1952); Data in above table refers to minimum inhibitory concentration (MIC values) in micrograms per millileters in the absence of human blood serum/in the presence of human blood serum.

We claim:

1. A process which comprises reacting a thiol of the formula

R'''—SH wherein R''' is a hydrogen, or a $C_1$ to $C_{12}$-hydrocarbon radical, a $C_1$ to $C_{12}$-hydrocarbon radical substituted with halogen, Carbo-$C_1$ to $C_3$-alkyloxy, carboxyl, or hydroxyl, or R''' is 2-pyrimidinyl, 2-tetrazolyl, 2-pyridinyl, 2-thienylmethyl, or 2-furylmethyl with a 2- methylene-Δ³-cephalosporin sulfoxide ester of the formula $$R-NH-CH-C\overset{O}{\underset{\uparrow}{\overset{S}{\diagup}}}H \begin{array}{c} \diagdown \\ \diagup \end{array} C=CH_2$$
$$O=C-N \qquad C-CH_2-X$$
$$\diagdown C \diagup$$
$$COOR'$$

wherein
R is an amino protecting group which is not removed by the oxidizing reagents, or the esterification reagents used in preparing these sulfoxide esters:
R' is an easily removable ester group; and X is hydrogen, hydroxyl, $C_1$ to $C_6$ alkyloxy, or a $C_1$ to $C_6$-alkanoyloxy radical in a liquid medium at a temperatures of from just above the freezing point to reflux temperatures of the mixture to form a 2-thiomethyl-Δ³-cephalosporin sulfoxide compound of the formula $$R-NH-CH-C\overset{O}{\underset{\uparrow}{\overset{S}{\diagup}}}H \begin{array}{c} \diagdown \\ \diagup \end{array} C-CH_2-S-R'''$$
$$O=C-N \qquad C-CH_2-X$$
$$\diagdown C \diagup$$
$$COOR'$$

wherein R, R', X, and R''' are as defined above.

2. A process as defined in claim 1 which further includes the steps of reacting the 2-thiomethyl-Δ³-cephalosporin sulfoxide compound with a $C_1$ to $C_6$-alkanoic acid in the presence of an alkali metal $C_1$ to $C_6$ alkanoate to form a 2-thiomethylene-Δ³-cephalosporin compound of the formula $$R-NH-CH-CH \begin{array}{c} S \\ \diagup \diagdown \end{array} C=CH-S-R'''$$
$$O=C-N \qquad C-CH_2-X$$
$$\diagdown C \diagup$$
$$COOR'$$

wherein R, R', R''', and X are as defined in claim 1.

3. A process as defined in claim 1 which further includes the steps of treating the 2-thiomethyl-Δ³-cephalosporin sulfoxide compound with reducing agents selected from the group consisting of:
(1) stannous, ferrous, or manganous cations,
(2) dithionite ($S_2O_4^{=}$), iodide, or ferrocyanide anions,
(3) trivalent phosphorus compounds having a molecular weight below about 500,
(4) a halomethylene iminium halide of the formula $$\left[\begin{array}{c} R^4 \\ \diagdown \\ R^5 \end{array} N=C \begin{array}{c} Z \\ \diagup \\ \diagdown H \end{array}\right]^{\oplus} Z^{\ominus}$$

wherein Z is chlorine or bromine and each of $R^4$ and $R^5$ taken separately denotes a $C_1$ to $C_3$-alkyl, or taken together with the nitrogen to which they are bonded, complete a monocyclic heterocyclic ring having from 5 to 6 ring forming atoms and a total of from 4 to 8 carbon atoms, in the presence of an activating agent which is an acid halide of an acid of carbon, sulphur, or phosphorus, which acid halide is inert to reduction by the reducing agent, and which acid halide has a second order hydrolysis constant, equal to, or greater than that of benzoyl chloride, in a substantially anhydrous liquid medium at a temperature of from about —20° C. to about 100° C. to form the 2-thiomethyl-Δ³-cephalosporin ester.

4. A process as defined in claim 3 in which the reduction of 2-thiomethyl-Δ³-cephalosporin sulfoxide compound is effected with (1) a trivalent phosphorus compound having at least one chlorine, bromine, or iodine bonded to the trivalent phosphorus atom, any remaining valences of the trivalent phosphorus atom being satisfied by a -hydrocarbon, —O-hydrocarbon, or —S-hydrocarbon radical which is free of aliphatic unsaturation and has from 1 to 8 carbon atoms, or such -hydrocarbon, —O-hydrocarbon, and —S-hydrocarbon radicals substituted with chlorine or bromine, or (2) a halomethylene iminium halide, as defined in claim 1, in the absence of an activating agent.

5. A process as defined in claim 1 wherein the amino-protecting group R is an acyl group of the formula $$\langle \underset{\phantom{.}}{\bigcirc} \rangle-(CH_2)_m-(O)_z-(CH_2)_n-CO-$$

wherein m is an integer of from 0 to 4, n is an integer of from 1 to 4, z is 0 or 1, and when z is 0, the methylene carbon atoms in m and n are connected by a chemical bond, and such acyl radicals substituted on ring phenyl 3,660,395

23 atoms with fluorine, chlorine, bromine, $C_1$ to $C_6$ alkyl, $C_1$ to $C_2$-alkyloxy, nitro, cyano, or trifluoromethyl groups;

$R^1$ is an ester group selected from the group consisting of 2,2,2-trichloroethyl; $C_4$ to $C_6$-tert-alkyl; $C_5$ to $C_7$-tert-alkenyl; $C_5$ to $C_7$-tert-alkynyl; —CH—R″ where R″ represents $C_1$ to $C_6$-alkanoyl
N-phthalimido
benzoyl
naphthoyl
furoyl
thenoyl
nitrobenzoyl
halobenzoyl
methylbenzoyl
methanesulfonylbenzoyl, or
phenylbenzoyl
benzyl
3- or 4-nitrobenzyl
3- or 4-methoxybenzyl
benzhydryl, or
trimethylsilyl; and X is hydrogen;

and R‴ of the thiol compound is a $C_1$ to $C_{12}$ hydrocarbon radical.

6. A process as defined in claim 5 which further includes the steps of reacting the 2-thiomethyl-Δ³-cephalosporin sulfoxide compound with acetic acid in the presence of sodium acetate to form the corresponding 2-thiomethylene-Δ³-cephalosporin ester.

7. A process as defined in claim 6 wherein the thiol is a $C_1$ to $C_{12}$-hydrocarbonthiol, the 2-methylene-Δ³-cephalosporin sulfoxide compound is one in which R is an acyl radical in which m is 0, z is 1, n is 1, R′ is 2,2,2-trichloroethyl, x is hydrogen, to form a 2,2,2-trichloroethyl 2-$C_1$ to $C_{12}$-hydrocarbon thiomethyl)-3-methyl - 7 - (phenoxyacetamido)-Δ³-cephem-4-carboxylate-1-oxide, which is reacted with acetic acid in the presence of sodium acetate to form a 2,2,2-trichloroethyl 2-($C_1$ to $C_{12}$-hydrocarbonthiomethylene)-3-methyl-7-(phenoxyacetamido) - Δ³ - cephalosporanate.

8. A process as defined in claim 7 wherein phenyl thiol is reacted with 2,2,2,-trichloroethyl 2-methylene-3-methyl-7-phenoxyacetamido-Δ³-cephem-4 - carboxylate - 1 - oxide, which product is treated with acetic acid in the presence of sodium acetate to form 2,2,2-trichloroethyl, 2-phenylthiomethylene-3-methyl-7-phenoxyacetamido-Δ³ - cephem-4-carboxylate.

9. A process as defined in claim 5, except that R‴ is a 2-pyrimidinyl, R is phenoxyacetyl, R′ is 2,2,2-trichloroethyl, X is hydrogen to form as an intermediate product 2,2,2-trichloroethyl 2 - (2-pyrimidinylthiomethyl)-3-methyl-7-phenoxyacetamido-Δ³-cephem-4 - carboxylate - 1 - oxide, which intermediate product is reduced to sulfide with phosphorus trichloride, and treated with zinc dust and acetic acid to remove the ester group and to form 2-(2′-pyrimidinylthiomethyl)-3-methyl-7-(phenoxyacetamido)-Δ³-cephem-4-carboxylic acid.

10. Compounds having a formula selected from the group consisting of (I)

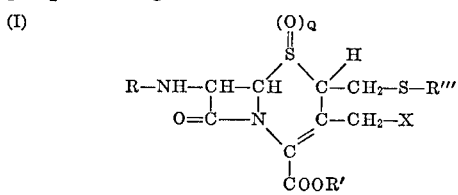

24 and (II)

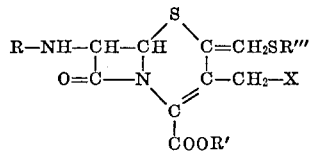

wherein

R is selected from the group consisting of phenoxyacetyl, phenylacetyl, phenylmercaptoacetyl, D-α-aminophenylacetyl, 2′-thienylacetyl, hydrogen, $C_6$ to $C_{12}$-hydrocarbon sulfonate salt;

X is hydrogen, $C_1$ to $C_6$-alkanoyloxy, $C_1$ to $C_6$-alkyloxy, or hydroxyl;

R′ is hydrogen, 2,2,2-trichloroethyl, or $C_4$ to $C_6$-tert-alkyl, phenacyl, 4-nitrobenzyl, or trimethylsilyl;

R‴ is $C_1$ to $C_{12}$-hydrocarbon radical, or a $C_1$ to $C_{12}$-hydrocarbon radical substituted with chlorine, bromine, carbomethoxy, carboxyl, hydroxy, or R‴ is 2-pyrimidinyl, 2-tetrazoyl, or 2-pyridinyl; and Q is 0 or 1, and salts of such compounds as the carboxylic acid group with sodium, potassium, or at an amino group with anions from acids having a pKa or less than about 4.

11. A compound as defined in claim 10 of Formula I wherein R is phenoxyacetyl, X is hydrogen, R′ is 2,2,2-trichloroethyl, and R‴ is a $C_1$ to $C_{12}$-hydrocarbon radical substituted with chlorine, bromine, carbomethoxy, carboxy, or hydroxy, and Q is 1.

12. A compound as defined in claim 11 wherein the compound is 2,2,2-trichloroethyl 2-(4′-bromophenylthiomethyl)-3-methyl-7-(phenoxyacetamido)-Δ³ - cephem - 4-carboxylate-1-oxide.

13. A compound as defined in claim 10 of Formula II wherein R is hydrogen, X is hydrogen, R′ is 2,2,2-trichloroethyl, and R‴ is a $C_1$ to $C_{12}$-hydrocarbon radical substituted with chlorine, bromine, carbomethoxy carboxy, or hydroxy.

14. A compound as defined in claim 13 wherein the compound is 2,2,2-trichloroethyl 2-(4′-bromophenylthiomethylene)-3-methyl-7-amino-Δ³-cephem-4-carboxylate.

15. A compound as defined in claim 10 in Formula II wherein R is thienylacetyl, X is $C_1$ to $C_6$-alkanoyloxy, R′ is hydrogen, and R‴ is a $C_1$ to $C_{12}$ hydrocarbon radical.

16. A compound as defined in claim 15 wherein the compound is 2-benzylthiomethylene-3-acetoxymethyl-7-(2′-thienylacetamido)-Δ³-cephem-4-carboxylic acid.

17. A compound as defined in claim 10 of Formula I wherein R is phenoxyacetyl, X is $C_1$ to $C_6$-alkanoyloxy, R′ is hydrogen, and R‴ is a $C_1$ to $C_{12}$-hydrocarbon radical substituted with chlorine, bromine, carbomethoxy, carboxy, or hydroxy, and Q is 0.

18. A compound as defined in claim 17 wherein the compound is 2-(4′-bromophenylthiomethyl)-3-acetoxymethyl-7-(2′-thienylacetamide)-Δ³-cephem-4-carboxyl is acid.

19. A compound as defined in claim 10 of Formula I wherein the compound is 3-methyl-2-(2′-pyrimidinylthiomethylene)-7-(phenoxyacetamido)-Δ³-cephem-4 - carboxylic acid.

References Cited
UNITED STATES PATENTS
3,516,997    7/1970   Takano et al. _____ 260—243 C NICHOLAS S. RIZZO, Primary Examiner U.S. Cl. X.R.
424—246; 260—239.1